(12) United States Patent
Osaki et al.

(10) Patent No.: US 9,162,658 B2
(45) Date of Patent: Oct. 20, 2015

(54) BRAKE CONTROL DEVICE FOR VEHICLE

(71) Applicant: ADVICS CO., LTD., Kariya-shi (JP)

(72) Inventors: Shintaro Osaki, Nissin (JP); Takahiro Kiso, Chiryu (JP)

(73) Assignee: ADVICS CO., LTD, Kariya-Shi, Aichi-Ken (JP)

( * ) Notice: Subject to any disclaimer, the term of this patent is extended or adjusted under 35 U.S.C. 154(b) by 125 days.

(21) Appl. No.: 13/754,117

(22) Filed: Jan. 30, 2013

(65) Prior Publication Data
US 2013/0197770 A1 Aug. 1, 2013

(30) Foreign Application Priority Data

Jan. 30, 2012 (JP) .................................. 2012-016863

(51) Int. Cl.
| | | |
|---|---|---|
| *G06F 19/00* | (2011.01) | |
| *B60T 8/34* | (2006.01) | |
| *B60T 7/22* | (2006.01) | |
| *B60T 8/00* | (2006.01) | |
| *B60T 17/22* | (2006.01) | |
| *B60T 13/66* | (2006.01) | |
| *B60T 13/14* | (2006.01) | |
| *B60T 7/12* | (2006.01) | |
| *B60T 8/36* | (2006.01) | |
| *B60T 8/48* | (2006.01) | |

(52) U.S. Cl.
CPC . *B60T 8/34* (2013.01); *B60T 7/122* (2013.01); *B60T 7/22* (2013.01); *B60T 8/00* (2013.01); *B60T 8/3655* (2013.01); *B60T 8/4872* (2013.01); *B60T 13/147* (2013.01); *B60T 13/662* (2013.01); *B60T 17/221* (2013.01); *B60T 2201/06* (2013.01)

(58) Field of Classification Search
CPC . B60T 2201/06; B60T 13/662; B60T 17/221; B60T 8/00; B60T 7/22
USPC .......................... 701/70; 303/155, 191, 114.3
See application file for complete search history.

(56) References Cited

U.S. PATENT DOCUMENTS

| | | | |
|---|---|---|---|
| 8,002,364 B2 | 8/2011 | Kokubo et al. | |
| 2007/0228823 A1* | 10/2007 | Kokubo et al. | 303/155 |

(Continued)

FOREIGN PATENT DOCUMENTS

JP 2007-276500 A 10/2007

OTHER PUBLICATIONS

Japanese Notification of Reasons for Refusal dated Apr. 15, 2014 issued in the corresponding Japanese Patent Application No. 2012-016863 and English language translation (6 pages).

*Primary Examiner* — Thomas G Black
*Assistant Examiner* — Sze-Hon Kong
(74) *Attorney, Agent, or Firm* — Buchanan Ingersoll & Rooney PC

(57) ABSTRACT

There is provided a brake control device for a brake device including a basic fluid pressure generating unit which generates a basic fluid pressure according to an operation to a brake operating member, a hydraulic pump which generates a fluid pressure to generate a differential pressure, a pressure regulating valve which regulates the differential pressure, and a friction brake mechanism which applies a fluid pressure obtained by adding the differential pressure to the basic fluid pressure, to a wheel cylinder. The control device includes a regulating unit which regulates the differential pressure according to an operating amount correlated value and which decreases the differential pressure according to an increase of the basic fluid pressure due to an increase of the operating amount correlated value when the vehicle is stopped and the differential pressure is regulated to a value larger than 0 by an operation to the brake operating member.

2 Claims, 9 Drawing Sheets

(56) References Cited

U.S. PATENT DOCUMENTS

| | | | |
|---|---|---|---|
| 2010/0062897 A1* | 3/2010 | Nishino et al. ................. | 477/29 |
| 2010/0131168 A1* | 5/2010 | Maruyama ..................... | 701/96 |
| 2010/0161191 A1* | 6/2010 | Kato et al. ..................... | 701/70 |
| 2011/0073419 A1* | 3/2011 | Matsuzaki et al. ......... | 188/106 P |

\* cited by examiner

BRAKE CONTROL DEVICE FOR VEHICLE

CROSS REFERENCE TO RELATED APPLICATIONS

This application is based on and claims priority under 35 U.S.C. §119 to Japanese Patent Application 2012-016863, filed on Jan. 30, 2012, the entire content of which is incorporated herein by reference.

BACKGROUND

1. Field of the Invention

The present invention relates to a brake control device for a vehicle.

2. Description of Related Art

There has been known a brake device including a master cylinder which generates a basic fluid pressure (master cylinder fluid pressure) according to an operation to a brake pedal by a driver, a hydraulic pump which generates a differential pressure generation fluid pressure to generate a differential pressure (a linear valve differential pressure) to be added to the basic fluid pressure, a pressure regulating valve (normally open linear electromagnetic valve) which regulates the differential pressure using the differential pressure generation fluid pressure, and a friction brake mechanism which applies a wheel cylinder fluid pressure, obtained by adding the differential pressure to the basic fluid pressure, to a wheel cylinder, thereby generating a friction braking force according to the wheel cylinder fluid pressure (for example, see JP-A-2007-276500).

In the brake device disclosed in JP-A-2007-276500, in order to reduce the load of the linear electromagnetic valve, the wheel cylinder fluid pressure is limited to "the minimum fluid pressure necessary for maintaining a vehicle in a stopped state on a sloping road" when the vehicle is in a stopped state.

Meanwhile, in the above brake device, when the vehicle is in a stopped state, the differential pressure is always maintained at a value larger than 0 while the driver is operating the brake pedal. In other words, the liner electromagnetic valve is always driven. Therefore, in terms of durability of the linear electromagnetic valve, there is a room for improvement in that brake device.

SUMMARY

Accordingly, an object of the present invention is to provide a brake control device for a vehicle which applies a wheel cylinder fluid pressure, obtained by adding a differential pressure regulated by a pressure regulating valve to a basic fluid pressure, to a wheel cylinder, while improving the durability of the pressure regulating valve.

According to an illustrative embodiment of the present invention, there is provided a brake control device for a vehicle, which is applied to a brake device including a basic fluid pressure generating unit which generates a basic fluid pressure according to an operation to a brake operating member by a driver, a hydraulic pump which generates a differential pressure generation fluid pressure to generate a differential pressure to be added to the basic fluid pressure, a pressure regulating valve which uses the differential pressure generation fluid pressure to regulate the differential pressure, and a friction brake mechanism which applies a wheel cylinder fluid pressure obtained by adding the differential pressure to the basic fluid pressure, to a wheel cylinder, thereby generating a friction braking force according to the wheel cylinder fluid pressure. The brake control device includes a differential pressure regulating unit which regulates the differential pressure by controlling the pressure regulating value according to an operating amount correlated value which is correlated with an operating amount of the brake operating member, and a determining unit which determines whether the vehicle is in a stopped state. The differential pressure regulating unit decreases the differential pressure according to an increase of the basic fluid pressure due to an increase of the operating amount correlated value in a case where it is determined that the vehicle is in the stopped state and the differential pressure is regulated to a value larger than 0 by an operation to the brake operating member.

According to the above configuration, while the vehicle is in a stopped state and the driver is operating the brake operating member (the differential pressure is greater than 0), if the operating amount of the brake operating member increases (typically, a depressing operation to the brake pedal is made), the differential pressure decreases by the increase amount of the basic fluid pressure. In other words, whenever the operating amount increases (whenever the basic fluid pressure increases), the differential pressure decreases. As a result, at the time when the accumulative increase amount of the basic fluid pressure reaches the magnitude of the differential pressure at the stop start timing of the vehicle, it may be possible to make the differential pressure 0 (and thus to stop the driving of the pressure regulating valve).

As s result, it is possible to reduce the driving time of the pressure regulating valve as compared to a case where the linear electromagnetic valves are continuously driven while the vehicle is in a stopped state and the driver is operating a brake pedal. As a result, the durability of the pressure regulating valve can be improved. Further, when the operating amount increases, the differential pressure decreases by the increase amount of the basic fluid pressure. Therefore, the wheel cylinder fluid pressure (which is the sum of the basic fluid pressure and the differential pressure) does not decrease (or it is difficult for the wheel cylinder fluid pressure to decrease). Therefore, in a case where the vehicle is in a stopped state on a sloping road, it may be possible to suppress the vehicle from slipping down due to an increase in the operating amount.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, illustrative embodiments of a brake control device for a vehicle will be described with reference to the accompanying drawings.

First Illustrative Embodiment

Figure 1:
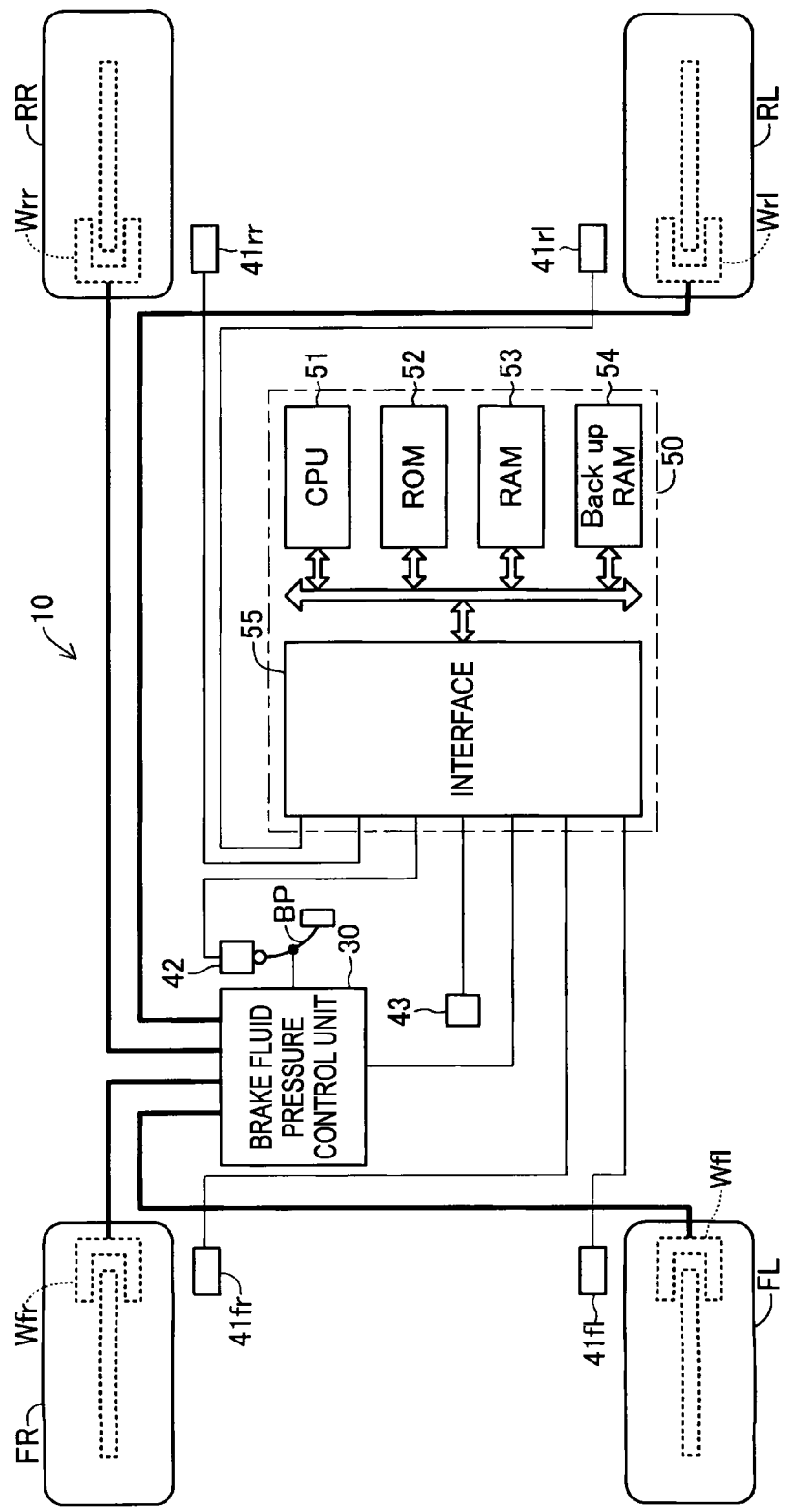
FIG. 1 is a view illustrating a schematic configuration of a vehicle including a brake control device according to a first illustrative embodiment of the present invention.

FIG. 1 shows a schematic configuration of a vehicle including a brake device 10 including a brake control device according to an illustrative embodiment of the present invention. Hereinafter, a symbol '**' added to the ends of various variables and reference numerals is a comprehensive symbol of "fr", "fl", "rr" and "rl" which are added to the ends of various variables and reference numerals for representing which of wheels FR, FL, RR, and RL the various variables and reference numerals relate to.

Figure 2:
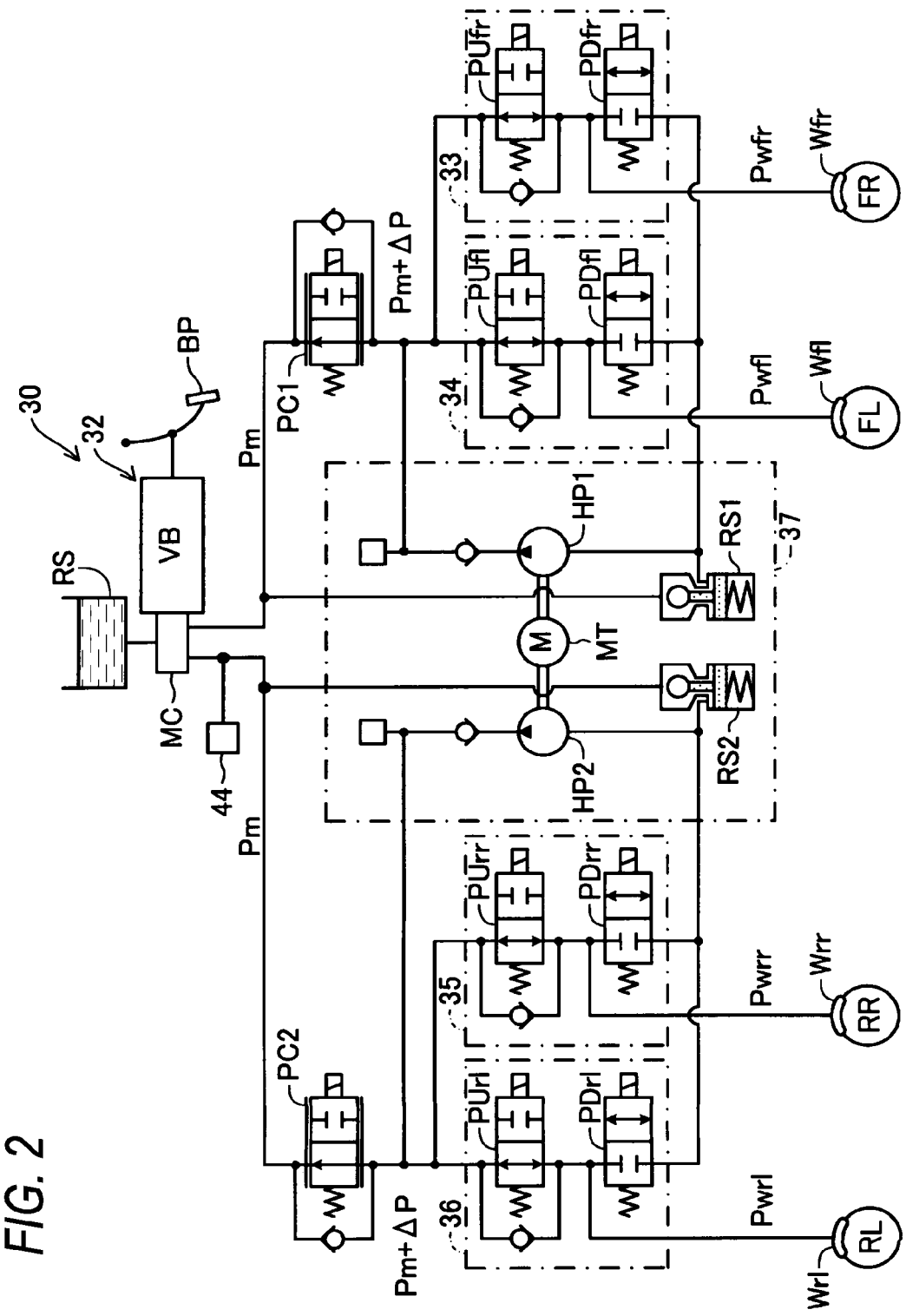
FIG. 2 is a view illustrating a schematic configuration of a brake fluid pressure control unit shown in FIG. 1.

The brake device 10 includes a brake fluid pressure control unit 30 which generates a friction braking force (friction braking torque) according to a wheel cylinder fluid pressure at wheels. As shown in FIG. 2, the brake fluid pressure control unit 30 includes a brake fluid pressure generating unit 32 which generates a fluid pressure according to a stroke (or a depressing force) of a brake pedal BP, brake fluid pressure regulating units 33 to 36 which regulate a wheel cylinder fluid pressure to be supplied to wheel cylinders W disposed at the respective wheels, and a reflux brake fluid supplying unit 37. Friction braking torques according to the wheel cylinders W are given to the wheels**.

The brake fluid pressure generating unit 32 includes a vacuum booster VB which operates according to the brake pedal BP, and a master cylinder MC which is connected to the vacuum booster VB. The vacuum booster VB is configured to use an air pressure (negative pressure) of the inside of a suction pipe of an engine (not shown) to assist an operation force of the brake pedal BP at a predetermined ratio, and transmit the assisted operation force to the master cylinder MC.

The master cylinder MC has two output ports, receives supply of brake fluid from a reservoir RS, and generates a fluid pressure (master cylinder fluid pressure Pm) according to the assisted operation force from the two ports. The configurations and operations of the master cylinder MC and the vacuum booster VB are known, and thus will not be described in detail here. The master cylinder fluid pressure Pm corresponds to a "basic fluid pressure".

A normally open linear electromagnetic valve PC1 is interposed between one port of the master cylinder MC and the upstream portion of the brake fluid pressure regulating units 33 and 34, and a normally open linear electromagnetic valve PC2 is interposed between the other port of the master cylinder MC and the upstream portion of the brake fluid pressure regulating units 35 and 36. The linear electromagnetic valves PC1 and PC2 will be described in detail later.

The brake fluid pressure regulating units 33 to 36 are configured by pressure booster valves PU which are normally open electromagnetic on-off valves of a two-port, two-position switching type, and pressure reducing valves PD which are normally closed electromagnetic on-off valves of a two-port, two-position switching type. Each pressure booster valve PU is capable of connecting or disconnecting the upstream portion of a corresponding regulating unit of the brake fluid pressure regulating units 33 to 36 to or from a corresponding wheel cylinder W. Each pressure reducing valve PD is capable of connecting or disconnecting a corresponding wheel cylinder W to or from a corresponding reservoir of the reservoirs RS1 and RS2. As a result, it is possible to increase, maintain, and reduce the fluid pressures (wheel cylinder fluid pressures Pw) of the wheel cylinders W by controlling the pressure booster valves PU and the pressure reducing valves PD.

The reflux brake fluid supplying unit 37 includes a DC motor MT, and two hydraulic pumps (gear pumps) HP1 and HP2 which are driven at the same time by the DC motor MT. The hydraulic pumps HP1 and HP2 are configured to draw the brake fluid in the reservoirs RS1 and RS2 returned from the pressure reducing valves PD** and supply the drawn brake fluid to the upstream portions of the brake fluid pressure regulating units 33 to 36.

Next, the normally open linear electromagnetic valves PC1 and PC2 will be described. On the valve body of each normally open linear electromagnetic valve PC1 or PC2, an opening direction force based on a biasing force from a coil spring (not shown) always acts, and an opening direction force based on a differential pressure (linear valve differential pressure $\Delta P$) obtained by subtracting the master cylinder fluid pressure Pm from the pressure of the upstream portion of corresponding regulating units of the brake fluid pressure regulating units 33 to 36, and a closing direction force based on pulling power which proportionally increases according to a current (a command current Id) supplied to the normally open linear electromagnetic valve PC1 or PC2 act.

Figure 3:
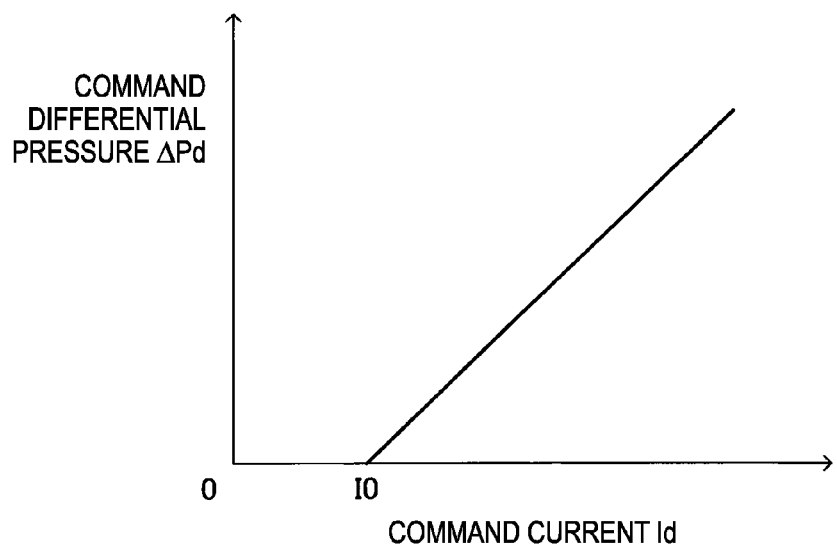
FIG. 3 is a graph illustrating the relation between a command current and a command differential pressure for a normally open linear electromagnetic valve shown in FIG. 2.

As a result, as shown in FIG. 3, a command differential pressure $\Delta Pd$ which is a command value of the linear valve differential pressure $\Delta P$ is determined to proportionally increase according to the command current Id. Here, a reference symbol "I0" represents a current value corresponding to the biasing force of the coil spring. The normally open linear electromagnetic valves PC1 and PC2 are closed when the command differential pressure $\Delta Pd$ is larger than the linear valve differential pressure $\Delta P$, and are opened when the command differential pressure $\Delta Pd$ is smaller than the linear valve differential pressure $\Delta P$. As a result, when the hydraulic pump HP1 or HP2 is being driven, brake fluid of the upstream portion of corresponding regulating units of the brake fluid pressure regulating units 33 to 36 flows toward a corresponding port of the master cylinder MC through a corresponding electromagnetic valve of the normally open linear electromagnetic valves PC1 and PC2, so that the linear valve differential pressure ΔP can be regulated to coincide with the command differential pressure ΔPd. The brake fluid flowing toward the corresponding port of the master cylinder MC returns to a corresponding reservoir of the reservoirs RS1 and RS2.

In other words, if the motor MT (accordingly, the hydraulic pumps HP1 and HP2) is driven, the linear valve differential pressure ΔP can be controlled according to the command current Id of the normally open linear electromagnetic valves PC1 and PC2. The pressures of the upstream portions of the brake fluid pressure regulating units 33 to 36 become a value (Pm+ΔP) obtained by adding the linear valve differential pressure ΔP to the master cylinder fluid pressure Pm. After the driving of the hydraulic pumps HP1 and HP2 is stopped in a state where the linear valve differential pressure ΔP is regulated to a value larger than 0, it is possible to regulate the linear valve differential pressure ΔP only in the reduction direction by controlling the command current Id in a reduction direction.

If the normally open linear electromagnetic valves PC1 and PC2 are made a non-excited state (that is, if the command current Id is set to "0"), the normally open linear electromagnetic valves PC1 and PC2 maintain an open state by the biasing forces of the coil springs. In this case, the linear valve differential pressure ΔP becomes "0", and the pressures of the upstream portions of the brake fluid pressure regulating units 33 to 36 become equal to the master cylinder fluid pressure Pm.

According to the above-described configuration, the brake fluid pressure control unit 30 is configured by a fluid pressure circuit of two systems, that is, a system relative to front right and left wheels FR and FL and a system relative to rear right and left wheels RR and RL. In the brake fluid pressure control unit 30, when all electromagnetic valves are in the non-excited state, the wheel cylinder fluid pressures Pw** are regulated to the same value as the master cylinder fluid pressure Pm.

In contrast, in this state, if the motor MT (accordingly, the hydraulic pumps HP1 and HP2) is driven and the normally open linear electromagnetic valves PC1 and PC2 are controlled, the wheel cylinder fluid pressures Pw can be regulated to a fluid pressure (Pm+ΔP). Further, if the pressure booster valves PU and the pressure reducing valves PD are controlled, the wheel cylinder fluid pressures Pw can be regulated independently for each wheel. In other words, regardless of an operation to the brake pedal BP by the driver, a braking force to be applied to the wheels** can be regulated independently for each wheel.

Referring back to FIG. 1, the brake device 10 includes wheel speed sensors 41** which detect the rotation speeds of the wheels, a brake switch 42 which selectively outputs a signal according to existence or non-existence of an operation to the brake pedal BP, a front/rear acceleration sensor 43 which detects acceleration in the front/rear direction of the vehicle body (front/rear acceleration), and a master cylinder fluid pressure sensor 44 (see FIG. 2) which detects the master cylinder fluid pressure Pm.

The wheel speed sensors 41** function as sensors for detecting whether the vehicle is in a stopped state. The front/rear acceleration sensor 43 has a function of outputting a value according to the tiling angle of the vehicle body in a vehicle body pitching direction. Therefore, the front/rear acceleration sensor 43 also functions as a gradient sensor for detecting the gradient of a road surface in the vehicle body pitching direction when the vehicle is in a stopped state.

The brake device 10 further includes an electronic control device 50. The electronic control device 50 is a micro-computer including a CPU 51, a ROM 52, a RAM 53, a backup RAM 54, an interface 55, and so on.

The interface 55 is connected to the sensors 41 to 44, supplies signals from the sensors 41 to 44 to the CPU 51, and transmits a drive signal to the electromagnetic valves (the normally open linear electromagnetic valves PC1 and PC2, the pressure booster valves PU, and the pressure reducing valves PD) of the brake fluid pressure control unit 30, and the motor MT based on an instruction of the CPU 51. Hereinafter, a case where all of the pressure booster valves PU and the pressure reducing valves PD are in the non-excited state, that is, a case where "PW**=Pm+ΔP" is satisfied will be described.

(Characteristics of Master Cylinder Fluid Pressure, Linear Valve Differential Pressure, and Wheel Cylinder Fluid Pressure)

Figure 4:
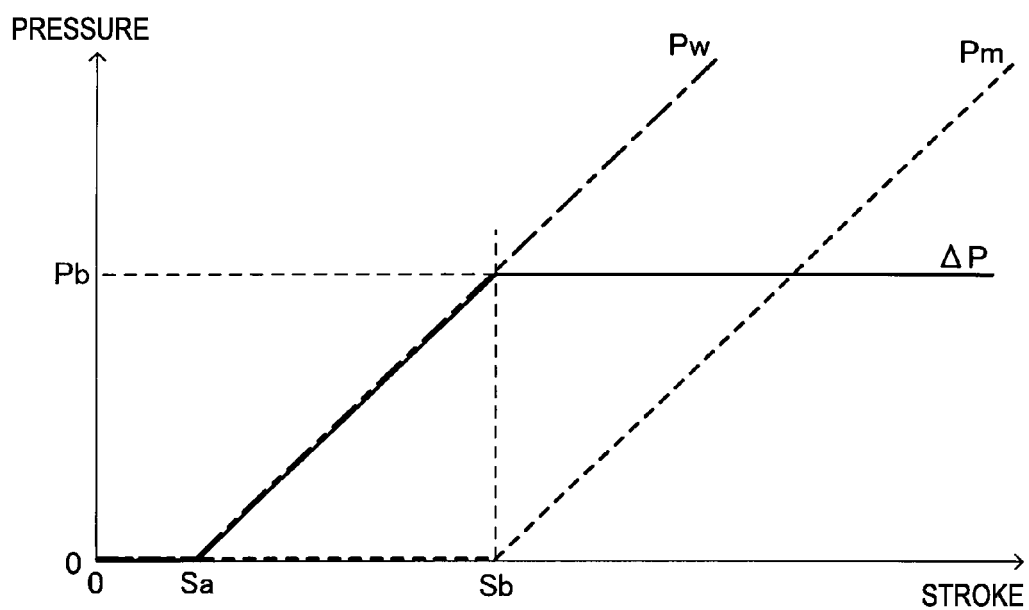
FIG. 4 is a graph illustrating the relation between a stroke of a brake pedal, and a master cylinder fluid pressure, a wheel cylinder fluid pressure and a linear valve differential pressure in a case of using the brake control device shown in FIG. 1.

In the brake device 10 having the above-described, during running of the vehicle, with respect to a stroke of the brake pedal BP (hereinafter, also referred to simply as "a stroke"), the master cylinder fluid pressure Pm, the linear valve differential pressure ΔP (the command differential pressure ΔPd), and the wheel cylinder fluid pressure Pw (=Pm+ΔP) are regulated as shown in FIG. 4.

Specifically, the master cylinder fluid pressure Pm (see a broken line) is maintained at 0 when the stroke is less than Sb, and increases from 0 according to an increase of the stroke when the stroke is equal to or greater than Sb. The linear valve differential pressure ΔP (see a solid line) is maintained at 0 when the stroke is less than Sa (<Sb), increases from 0 to Pb according to an increase of the stroke when the stroke is between Sa and Sb, and has a constant value Pb regardless of the stroke when the stroke is equal to or greater than Sb. As a result, the wheel cylinder fluid pressure Pw (see a dotted line) is maintained at 0 when the stroke is less than Sa, and increases from 0 according to an increase of the stroke when the stroke is equal to or greater than Sa. Further, the gradient of the increase of the master cylinder fluid pressure Pm and the gradient of the increase of the linear valve differential pressure ΔP coincide with each other. Therefore, the gradient of the increase of the wheel cylinder fluid pressure Pw is constant within a range where the stroke is equal to or greater than Sa.

Figure 5:
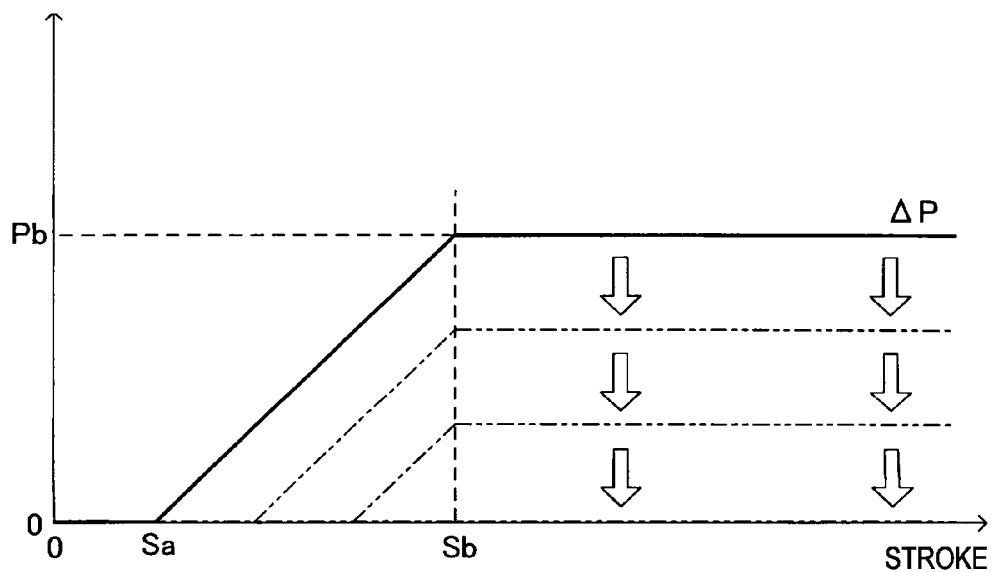
FIG. 5 is a view for explaining how the relation between a stroke and the linear valve differential pressure changes according to depressing of the brake pedal in a case of using the brake control device shown in FIG. 1.

In the brake device 10, the above-described characteristics shown in FIG. 4 are also applied in principal even after the vehicle is stopped by an operation to the brake pedal BP. Further, in the brake device 10, while the vehicle is stopped, in a state where the stroke is greater than Sb (in a state where the master cylinder fluid pressure Pm increases according to the increase of the stroke and the linear valve differential pressure ΔP is greater than 0), when the brake pedal BP is depressed (that is, increasing of the stroke), the linear valve differential pressure ΔP (command differential pressure ΔPd) decreases by the increase amount of the master cylinder fluid pressure Pm, as shown in FIG. 5.

Figure 6:
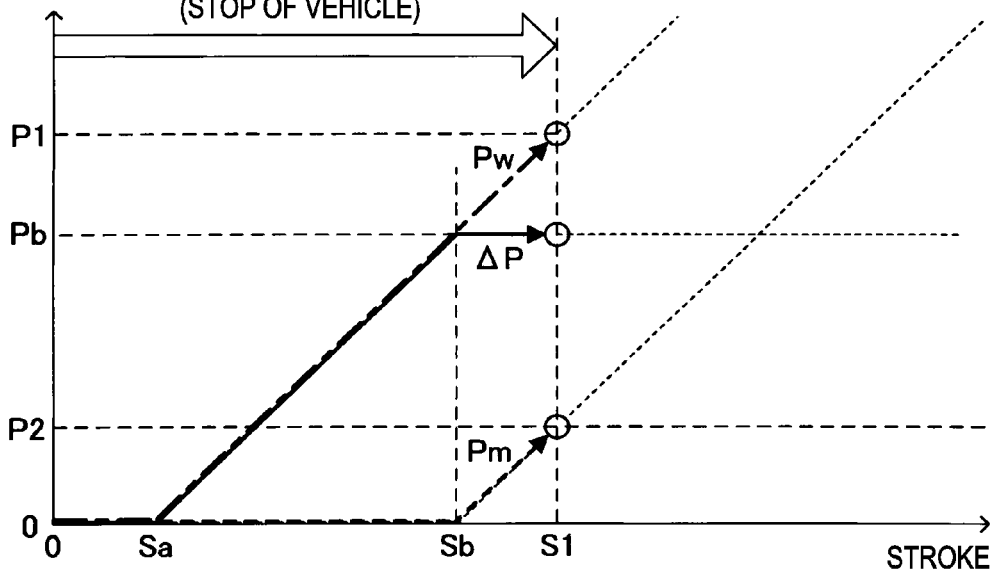
FIG. 6 is a graph illustrating exemplary changes of the master cylinder fluid pressure, the wheel cylinder fluid pressure, and the linear valve differential pressure when a running vehicle is stopped by depressing of the brake pedal in a case of using the brake control device shown in FIG. 1.

FIG. 6 shows exemplary changes in the master cylinder fluid pressure Pm, the linear valve differential pressure ΔP, and the wheel cylinder fluid pressure Pw in a case where the vehicle is stopped on a sloping road (or a flat road) by depressing the brake pedal BP during running of the vehicle. In this example, in a state where the stroke is maintained at S1 (>Sb) (that is, the master cylinder fluid pressure Pm is P2, the linear valve differential pressure ΔP is Pb, and the wheel cylinder fluid pressure Pw is P1 (=P2+ΔPb)), the vehicle transitions from the running state to the stopped state. In other words, when the wheel cylinder fluid pressure Pw is P1, the vehicle does not slide down on the sloping road.

Figure 7:
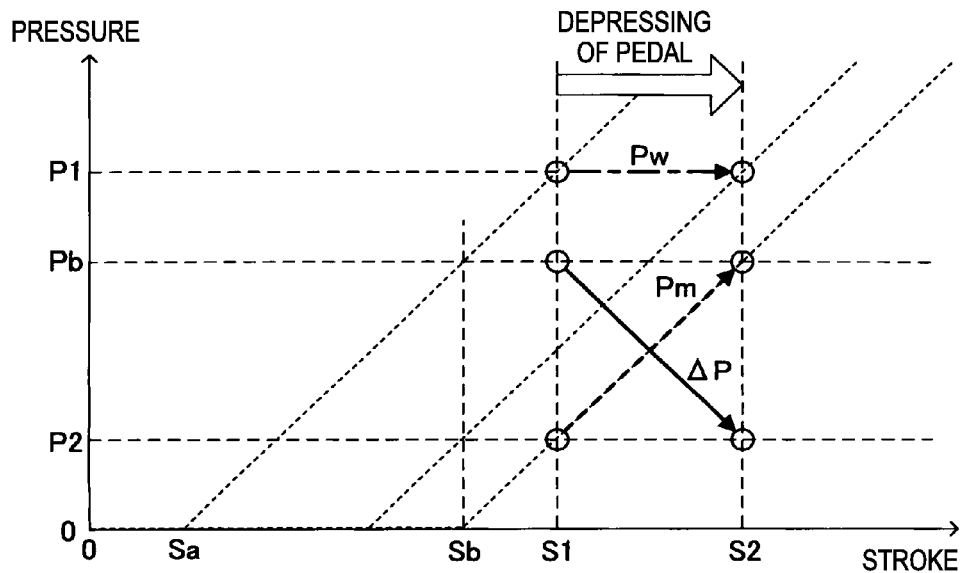
FIG. 7 is a graph illustrating exemplary changes of the master cylinder fluid pressure, the wheel cylinder fluid pressure, and the linear valve differential pressure while the brake pedal is further depressed from the state shown in FIG. 6 when the vehicle is in a stopped state.

FIG. 7 shows an example where the brake pedal BP is further depressed from the state (where the stroke is S1) shown in FIG. 6. In this example, the stroke increases from S1 to S2 (>S1), and accordingly, the master cylinder fluid pressure Pm increases from P2 to Pb according to the characteristic shown by the broken line in FIG. 4. In this case, the linear valve differential pressure ΔP (command differential pressure ΔPd) is not maintained at constant Pb, but decreases from Pb to P2. For example, the linear valve differential pressure ΔP decreases such that the characteristic of the linear valve differential pressure ΔP shown in FIG. 4 is offset by the increase amount of the master cylinder fluid pressure Pm in the reduction direction of the command differential pressure (see FIG. 5). As a result, the wheel cylinder fluid pressure Pw is maintained at constant P1. As described above, in the brake device 10, even if the linear valve differential pressure ΔP decreases by depressing of the brake pedal BP, the wheel cylinder fluid pressure Pw does not decrease. Therefore, the vehicle does not slip down on the sloping road.

Figure 8:
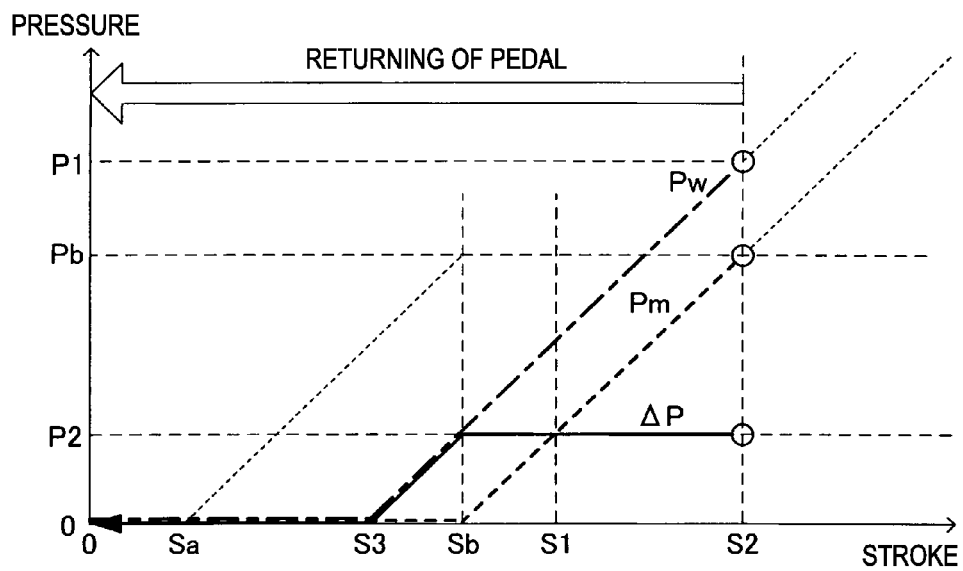
FIG. 8 is a graph illustrating exemplary changes of the master cylinder fluid pressure, the wheel cylinder fluid pressure, and the linear valve differential pressure if the brake pedal is returned from the state shown in FIG. 7 when the vehicle is in a stopped state.

FIG. 8 shows an example where the brake pedal BP is returned from the state (where the stroke is S2) shown in FIG. 7. In this example, the stroke decreases from S2 to 0, and accordingly, the master cylinder fluid pressure Pm decreases from Pb to 0 according to the characteristic shown by the broken line in FIG. 4. In this case, the linear valve differential pressure ΔP (command differential pressure ΔPd) is maintained at P2 within a range in which the stroke is equal to or greater than Sb, and decreases from P2 to 0 according to the decrease of the stroke within a range in which the stroke is less than Sb (specifically, from S3 to Sb). As a result, the wheel cylinder fluid pressure Pw decreases according to the decrease of the master cylinder fluid pressure Pm within a range in which the stroke is equal to or greater than Sb, and decreases according to the decrease of the linear valve differential pressure ΔP within the range in which the stroke is less than Sb (specifically, from S3 to Sb). For example, the characteristic of the linear valve differential pressure ΔP which is offset by the increase amount of the master cylinder fluid pressure Pm according to further depressing of the brake pedal BP in the reduction direction of the command differential pressure is maintained, and the linear valve differential pressure ΔP decreases according to that characteristic. Here, the gradient of the decrease of the master cylinder fluid pressure Pm and the gradient of the decrease of the linear valve differential pressure ΔP coincide with each other. Therefore, the gradient of the decrease of the wheel cylinder fluid pressure Pw is constant within a range in which the stroke is between S3 and S2.

As described above, in the brake device 10, when a returning operation to the brake pedal BP is performed, it is possible to smoothly and reliably decrease the wheel cylinder fluid pressure Pw in synchronization with the decrease of the stroke, that is, the intention of the driver to decrease the wheel cylinder fluid pressure.

Figure 9:
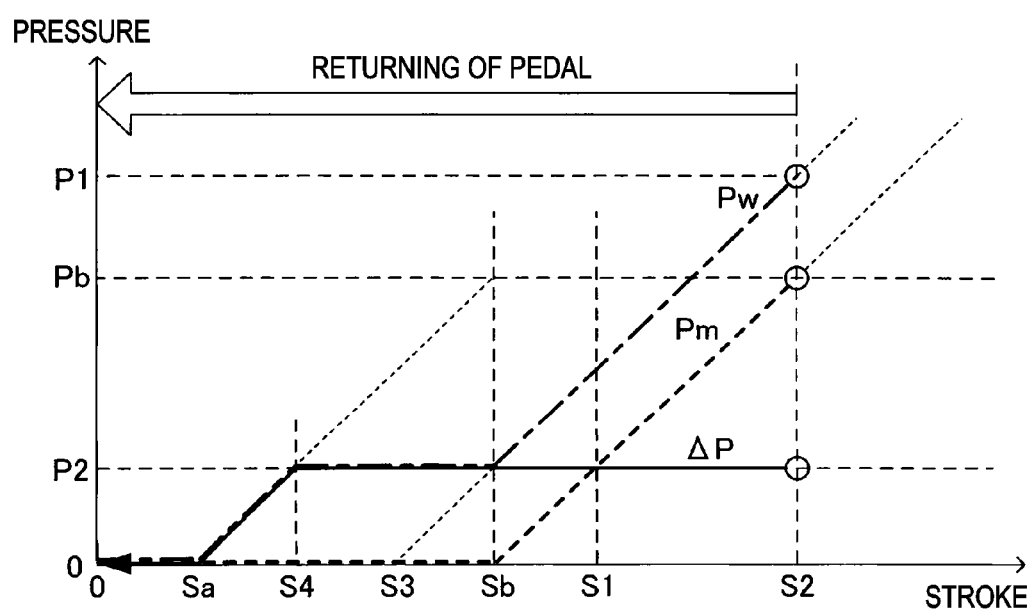
FIG. 9 is a graph of a comparative example corresponding to FIG. 8.

Hereinafter, "smooth decreasing" of the wheel cylinder fluid pressure Pw will be additionally described. FIG. 9 shows a case where in place of the brake device, a comparative example is used in the same situation as that of the example shown in FIG. 8. In this comparative example, in a case where a returning operation to the brake pedal BP is performed, the linear valve differential pressure ΔP is determined to a smaller value between a present value and a value determined according to the characteristic shown by the solid line in FIG. 4. Therefore, in the example shown in FIG. 9, the linear valve differential pressure ΔP is maintained at P2 even when the stroke becomes less than Sb, and decreases from P2 toward 0 after the stroke reaches S4.

Therefore, in a process where the stroke decreases from Sb to S4, the wheel cylinder fluid pressure Pw does not decrease according to the intention of the driver. As a result, the timing for the vehicle to start to slip down is delayed, and thus a strange feeling (such as a feeling as if the wheel cylinder fluid pressure is remaining, and a jerky feeling) might be caused to the driver. In contrast, in the brake device 10, as shown in FIG. 8, even after the stroke becomes less than Sb, the wheel cylinder fluid pressure Pw continuously and smoothly decreases. Therefore, the above-explained strange feeling is not caused to the driver.

Figure 10:
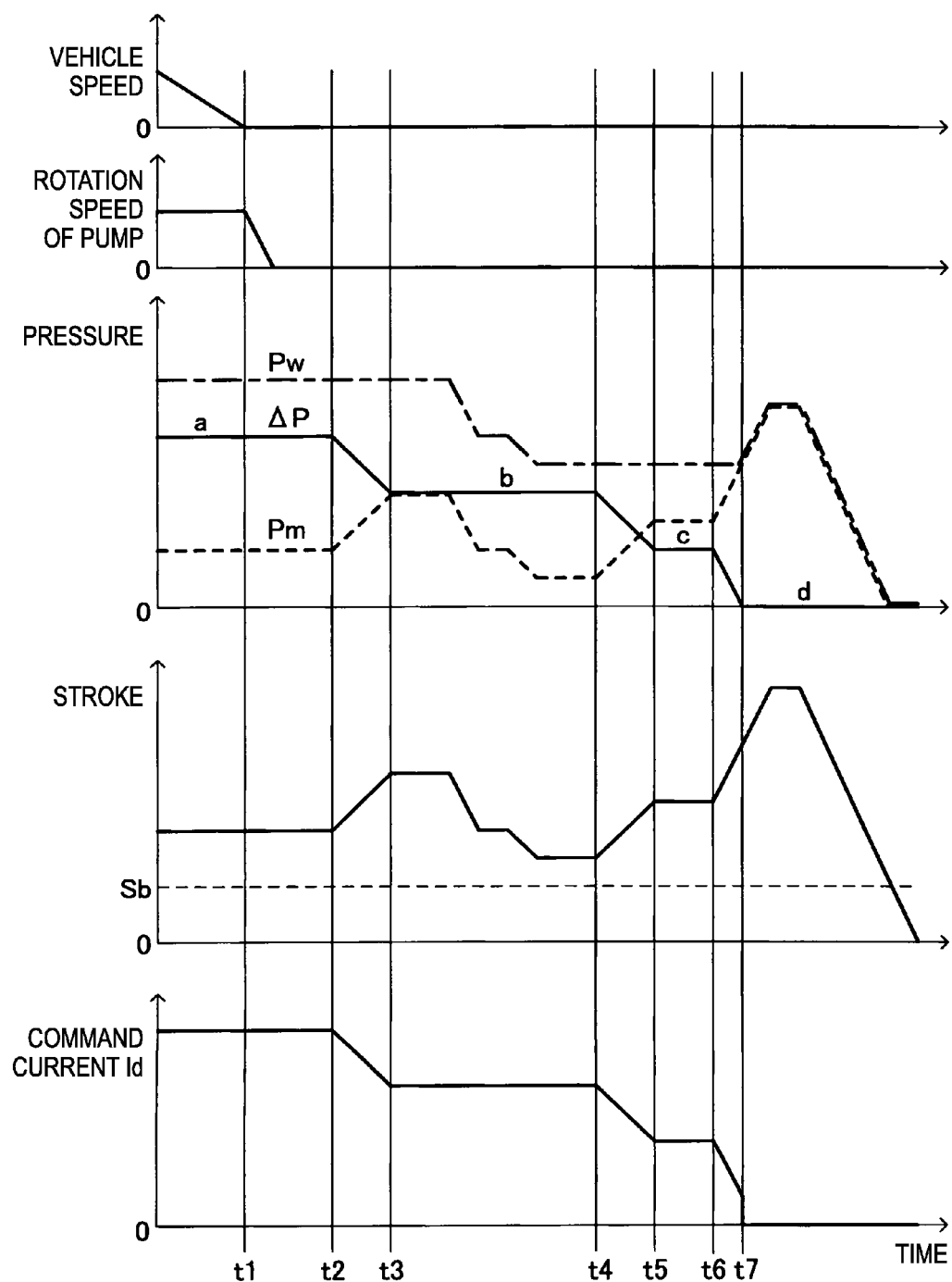
FIG. 10 is a time chart illustrating exemplary changes of various values in a case of using the brake control device shown in FIG. 1.

FIG. 10 shows an example where the brake device 10 is used. In this example, at a time t1, the vehicle is stopped on a sloping road (or a flat road) by depressing the brake pedal BP (the stroke becomes greater than Sb) while the vehicle is running. In this example, after the time t1, the driving of the hydraulic pumps HP1 and HP2 stop. However, the hydraulic pumps HP1 and HP2 may be continuously driven.

Figure 11:
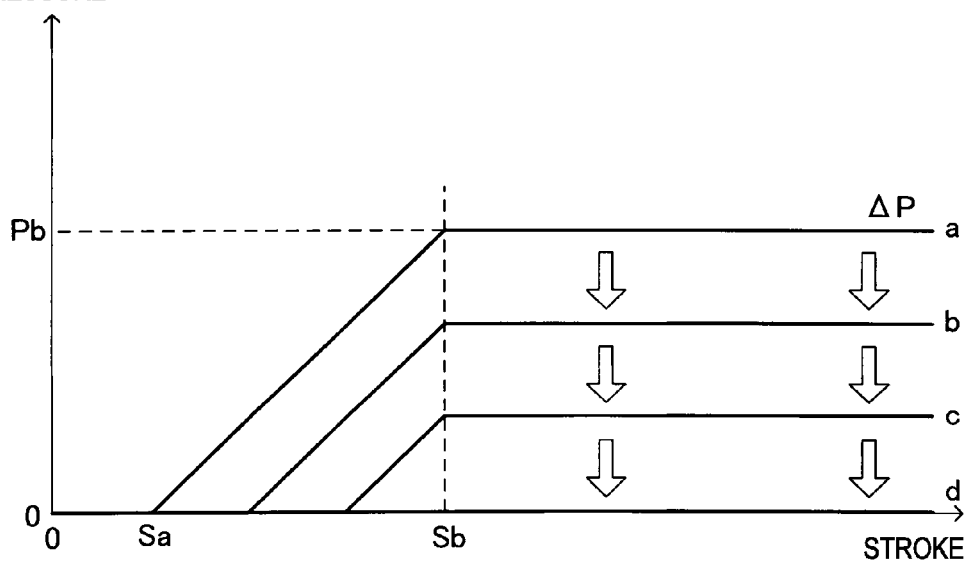
FIG. 11 is a view for explaining a change of the relation between the stroke and the linear valve differential pressure, corresponding to the example shown in FIG. 10.

In this example, after the time t1, from a time t2 to a time t3, from a time t4 to a time t5, and from a time t6 to a time t7, the brake pedal is further depressed (increase of the stroke). Therefore, the linear valve differential pressure ΔP (command differential pressure ΔPd) decreases by the increase amount of the master cylinder fluid pressure Pm whenever the stroke increases. As a result, the characteristic of the linear valve differential pressure ΔP before the time t2 is represented by a "characteristic a" of FIG. 11 (which is the same as the characteristic shown by the solid line in FIG. 4). The characteristic from the time t3 to the time t4 is represented by a "characteristic b" of FIG. 11, the characteristic from the time t5 to the time t6 is represented by a "characteristic c" of FIG. 11, and the characteristic after the time t7 (that is, after the linear valve differential pressure ΔP reaches 0) is represented by a "characteristic d" (ΔP=0) of FIG. 11.

As described above, in the brake device 10, while the vehicle is in a stopped state, whenever the master cylinder fluid pressure Pm increases according to the increase of the stroke of the brake pedal BP, the linear valve differential pressure ΔP decreases. As a result, at the time when the accumulative increase amount of the master cylinder fluid pressure Pm reaches the linear valve differential pressure ΔP at the stop start timing of the vehicle, it is possible to make the linear valve differential pressure ΔP to 0. That is, it is possible to stop the driving of the normally open linear electromagnetic valves PC1 and PC2. As s result, it is possible to reduce the driving times of the linear electromagnetic valves as compared to a brake device of JP-A-2007-276500 explained in "BACKGROUND" section, in which the linear electromagnetic valves are continuously driven while the vehicle is in a stopped state and the driver is operating a brake pedal. As a result, the durability of the linear electromagnetic valves can be improved.

The present invention is not limited to the above-mentioned illustrative embodiment, and various modifications can be made within the scope of the present invention. For example, in the above-described illustrative embodiment, as shown in FIG. 4, the master cylinder fluid pressure Pm, the linear valve differential pressure ΔP, and the wheel cylinder fluid pressure Pw are regulated according to the stroke of the brake pedal BP. However, the master cylinder fluid pressure Pm, the linear valve differential pressure ΔP, and the wheel cylinder fluid pressure Pw may be regulated according to depressing force of the brake pedal BP.

Further, in the above-described illustrative embodiment, the brake fluid pressure control unit 30 is configured by a fluid pressure circuit of two systems, that is, the system relative to the front right and left wheels FR and FL and the system relative to the rear right and left wheels RR and RL. However, the brake fluid pressure control unit 30 may be configured by a fluid pressure circuit of two systems, that is, a system relative to the front left wheel FL and the rear right wheel RR and a system relative to the front right wheel FR and the rear left wheel RL.

Further, in the above-described illustrative embodiment, as shown in FIGS. 4 and 8, the gradient of change of the master cylinder fluid pressure Pm and the gradient of change of the linear valve differential pressure ΔP with respect to the stroke coincide with each other. However, they may not coincide with each other.

Further, in the above-described illustrative embodiment, as shown in FIG. 4, the master cylinder fluid pressure Pm is maintained at 0 when the stroke is less than Sb, and increases from 0 according to the increase of the stroke when the stroke is equal to or greater than Sb. However, the master cylinder fluid pressure Pm may increase from 0 according to the increase of the stroke from 0.

Figure 12:
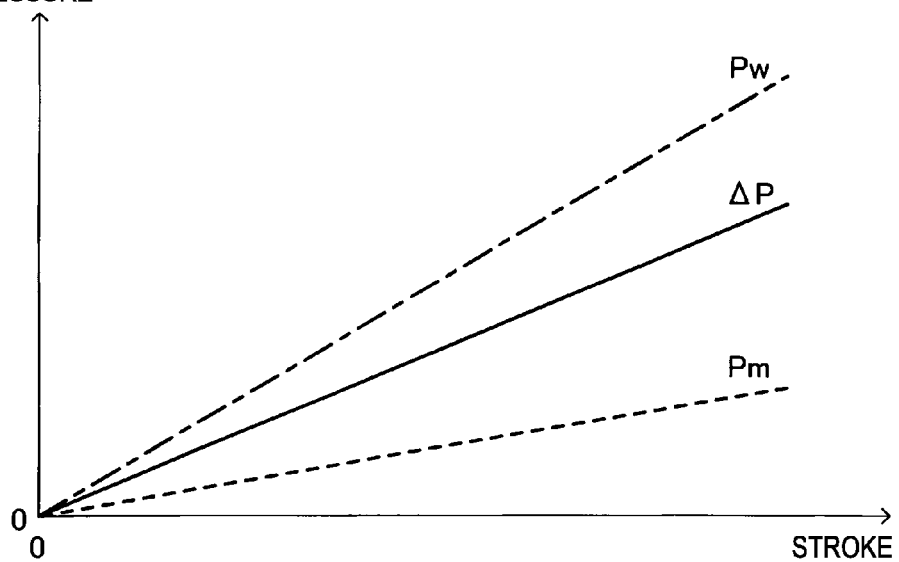
FIG. 12 is a graph corresponding to FIG. 4 in a case of using a brake control device according to a modified illustrative embodiment of the present invention.
Figure 13:
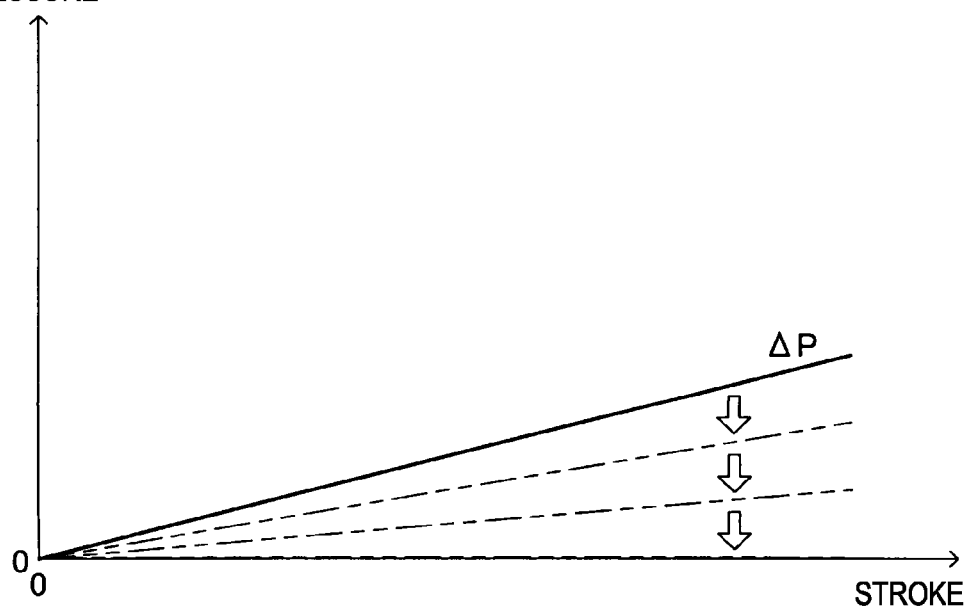
FIG. 13 is a graph corresponding to FIG. 5 in a case of using a brake control device according to another illustrative embodiment of the present invention.

In this case, as shown in FIG. 12, if the linear valve differential pressure ΔP also increases according to the increase of the stroke from 0, it is possible to smoothly increase the wheel cylinder fluid pressure Pw from 0 according to the increase of the stroke from 0. Also, in this case, whenever depressing of the brake pedal BP (that is, increasing of the stroke) is made while the vehicle is in a stopped state, as shown in FIG. 13, the linear valve differential pressure ΔP (command differential pressure ΔPd) decreases by the increase amount in the master cylinder fluid pressure Pm.

What is claimed is:

1. A brake control device for a vehicle, which is applied to a brake device including a basic fluid pressure generating unit which generates a basic fluid pressure according to an operation to a brake operating member by a driver, a hydraulic pump which generates a differential pressure generation fluid pressure to generate a differential pressure to be added to the basic fluid pressure, a pressure regulating valve which uses the differential pressure generation fluid pressure to regulate the differential pressure, and a friction brake mechanism which applies a wheel cylinder fluid pressure obtained by adding the differential pressure to the basic fluid pressure, to a wheel cylinder, thereby generating a friction braking force according to the wheel cylinder fluid pressure, the brake control device comprising:

a differential pressure regulating unit which regulates the differential pressure by controlling the pressure regulating valve according to an operating amount correlated value which is correlated with an operating amount of the brake operating member; and a determining unit which determines whether the vehicle is in a stopped state, wherein the differential pressure regulating unit decreases the differential pressure according to an increase of the basic fluid pressure due to an increase of the operating amount correlated value in a case where it is determined that the vehicle is in the stopped state and the differential pressure is regulated to a value larger than 0 by an operation to the brake operating member, and wherein the differential pressure regulating unit maintains the differential pressure at a constant value when the basic fluid pressure is decreased due to a decrease of the operating amount correlated value in a case where it is determined that the vehicle is in the stopped state and the differential pressure is regulated to a value larger than 0 by an operation to the brake operating member.

2. The brake control device according to claim 1, wherein the brake device is configured such that the basic fluid pressure is maintained at 0 when the operating amount correlated value is between 0 and a first predetermined value larger than 0, and increases from 0 according to an increase of the operating amount correlated value from the first predetermined value, and wherein the differential pressure regulating unit maintains the differential pressure at a constant value when the operating amount correlated value decreases in a case where the operating amount correlated value is equal to or greater than the first predetermined value, and decrease the differential pressure according to a decrease of the operating amount correlated value in a case where the operating amount correlated value is less than the first predetermined value.

\* \* \* \* \*